(12) United States Patent
Sherbeck

(10) Patent No.: US 11,692,629 B2
(45) Date of Patent: Jul. 4, 2023

(54) OVAL SEAL ASSEMBLY FOR PRESSURE CONTAINING BODIES

(71) Applicant: FORUM US, INC., Houston, TX (US)

(72) Inventor: Timothy Sherbeck, Katy, TX (US)

(73) Assignee: Forum US, Inc., Houston, TX (US)

( * ) Notice: Subject to any disclaimer, the term of this patent is extended or adjusted under 35 U.S.C. 154(b) by 194 days.

(21) Appl. No.: 17/112,202

(22) Filed: Dec. 4, 2020

(65) Prior Publication Data

US 2022/0178444 A1 Jun. 9, 2022

(51) Int. Cl.
*F16J 15/10* (2006.01)

(52) U.S. Cl.
CPC .................................. *F16J 15/104* (2013.01)

(58) Field of Classification Search
CPC .............................. F16J 15/104; F16J 15/106
See application file for complete search history.

(56) References Cited

U.S. PATENT DOCUMENTS

| | | | | |
|---|---|---|---|---|
| 2,307,828 | A * | 1/1943 | Eggleston | F16J 15/104 285/341 |
| 3,555,610 | A * | 1/1971 | Reiterman | F16J 15/104 425/808 |
| 4,593,915 | A * | 6/1986 | Seger | F16K 3/0227 138/44 |
| 4,644,974 | A | 2/1987 | Zingg | |
| 6,857,444 | B2 * | 2/2005 | Davis | B08B 3/026 137/115.11 |
| 8,590,627 | B2 | 11/2013 | Jin et al. | |
| 8,602,113 | B2 | 12/2013 | Jin et al. | |
| 10,330,217 | B2 | 6/2019 | Elliott | |
| 10,808,491 | B1 * | 10/2020 | Dirocco | E21B 33/128 |
| 2006/0124182 | A1 * | 6/2006 | Kim | F16K 31/0631 137/625.65 |
| 2009/0321146 | A1 * | 12/2009 | Dick | E21B 10/22 175/371 |
| 2010/0018778 | A1 * | 1/2010 | Nanayakkara | E21B 10/25 175/371 |
| 2011/0285094 | A1 * | 11/2011 | Henry | F16L 13/142 277/626 |
| 2016/0102768 | A1 * | 4/2016 | Lo Cicero | F16J 15/106 277/500 |
| 2016/0223089 | A1 * | 8/2016 | Nijland | F16K 3/0263 |

(Continued)

FOREIGN PATENT DOCUMENTS

| CN | 102869848 B | 4/2016 |
|---|---|---|
| GB | 2533642 A | 6/2016 |

*Primary Examiner* — Eugene G Byrd
(74) *Attorney, Agent, or Firm* — Patterson + Sheridan, LLP

(57) ABSTRACT

Aspects of the disclosure relate to seal assemblies, and associated components thereof, and methods of using the same for use in pressure containing bodies, such as choke valves. In one example, a sensor is used with the seal assemblies. In one implementation, a pressure containing body apparatus includes a pressure containing body including a central opening and a central axis extending through the central opening. The pressure containing body apparatus includes a sleeve disposed in the central opening of the pressure containing body. The pressure containing body apparatus includes an angled seal disposed about the sleeve at an angle relative to the central axis of the pressure containing body. The angle is greater than 0 degrees and less than 90 degrees.

18 Claims, 8 Drawing Sheets

(56) References Cited

U.S. PATENT DOCUMENTS

2016/0348468 A1   12/2016  Blacklock
2019/0049024 A1*  2/2019  Marks .................. F16K 11/076
2020/0088306 A1   3/2020  Haro-Valdez et al.

* cited by examiner

OVAL SEAL ASSEMBLY FOR PRESSURE CONTAINING BODIES

BACKGROUND

Field

Aspects of the disclosure relate to seal assemblies, and associated components thereof, and methods of using the same for use in pressure containing bodies, such as choke valves. In one example, a sensor is used with the seal assemblies.

Description of the Related Art

Pressure containing bodies are often used to transfer fluids at high pressures high flow rate from one location to another. Over time, the fluids can erode components within the pressure containing bodies and cause the pressure containing bodies to leak. It can be difficult to predict and detect such erosion or leaks. When leaking occurs, it can delay operations, cost time, and cost money and resources. In certain circumstances, leaking of pressure containing bodies can cause production operations to cease at least temporarily to repair the leak.

Therefore, there is a need for pressure containing bodies that indicate erosion, and seal assemblies that facilitate positioning seals in angled positions to facilitate ease of use, ease of installation and replacement, and cost savings and operational time savings.

SUMMARY

Aspects of the disclosure relate to seal assemblies, and associated components thereof, and methods of using the same for use in pressure containing bodies, such as choke valves. In one example, a sensor is used with the seal assemblies.

In one implementation, a pressure containing body apparatus includes a pressure containing body including a central opening and a central axis extending through the central opening. The pressure containing body apparatus includes a sleeve disposed in the central opening of the pressure containing body. The pressure containing body apparatus includes an angled seal disposed about the sleeve at an angle relative to the central axis of the pressure containing body. The angle is greater than 0 degrees and less than 90 degrees.

In one implementation, a pressure containing body apparatus includes a pressure containing body including a central opening and a central axis extending through the central opening. The pressure containing body apparatus includes a first sleeve disposed in the central opening of the pressure containing body. The first sleeve includes a cylindrical portion and an outer shoulder extending outwardly relative to the cylindrical portion. The pressure containing body apparatus includes a seal disposed about the first sleeve and between a first face of a first retainer segment and a second face of a second retainer segment. The first retainer segment and the second retainer segment are disposed about the cylindrical portion of the first sleeve. Each of the first face and the second face includes a retainer surface formed at an angle relative to the central axis of the pressure containing body. The angle is greater than 0 degrees and less than 90 degrees.

In one implementation, a seal assembly for disposal in a pressure containing body includes a first retainer segment including a first central opening, a first central axis extending through the first central opening, and a first face having a first retainer surface formed at an angle relative to the first central axis. The angle is greater than 0 degrees and less than 90 degrees. The seal assembly includes a second retainer segment including a second face having a second retainer surface facing the first retainer surface. The second retainer surface is formed at the angle. The seal assembly includes a seal retained between the first retainer surface and the second retainer surface. The seal is retained at the angle.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1A:
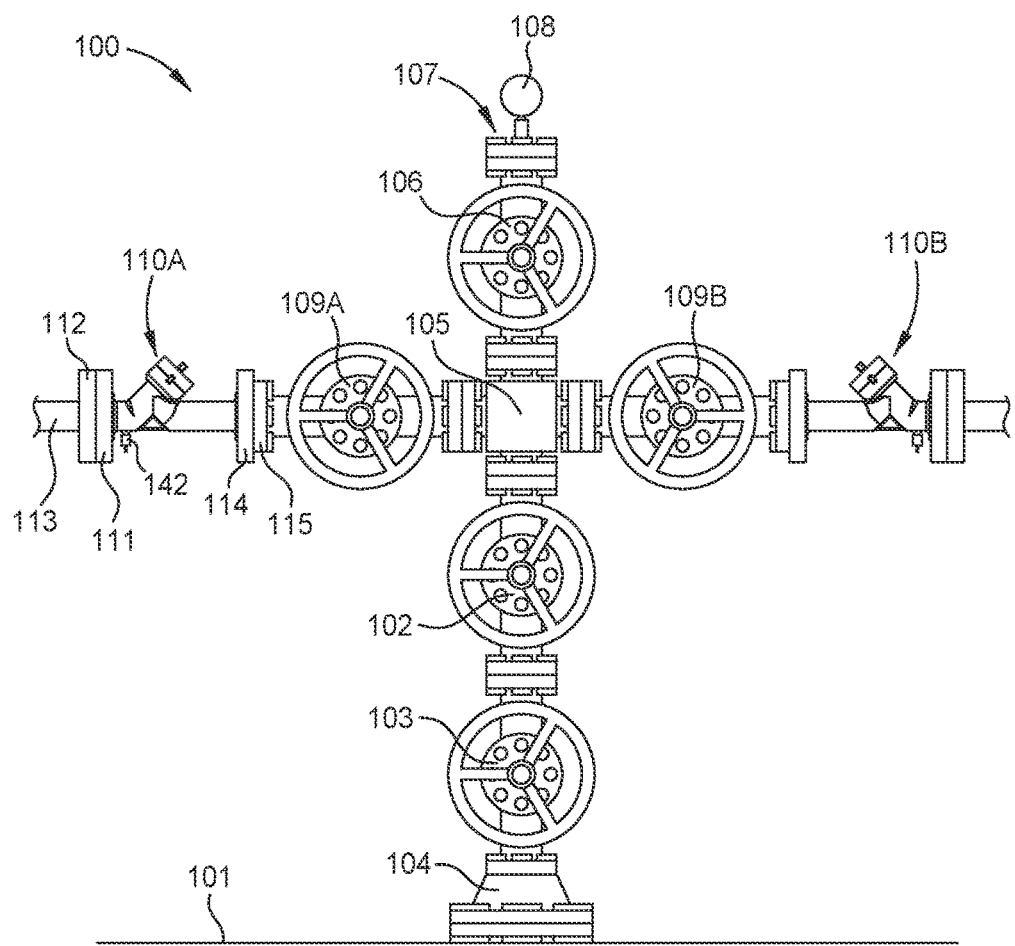
FIG. 1A is a schematic front view of a Christmas tree disposed at a wellhead of a well, according to one implementation.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the disclosure relate to seal assemblies, and associated components thereof, and methods of using the same for use in pressure containing bodies, such as choke valves. In one example, a sensor is used with the seal assemblies.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling.

FIG. 1A is a schematic front view of a tree 100 (also referred to as a "Christmas tree") disposed at a wellhead of a well, according to one implementation. The tree 100 is an assembly of valves, blocks, covers, spools, flanges, fittings, etc. used to regulate fluid flow into and out of the well. The tree 100 is disposed at a surface 101 of the well. In one embodiment, which can be combined with other embodiments, the well is an oil and gas well. In one embodiment, which can be combined with other embodiments, the well is a fracked well. Oil and/or gas produced from the well flows out of the wellhead and through the tree 100. The well may include relatively large amounts of abrasive material, such as sand, in the oil and/or gas flow. The tree 100 includes an upper master valve 102 and a lower master valve 103 coupled to a production head 104. The tree 100 includes an intersection block 105 disposed above the upper master valve 102, and a swab valve 106 coupled above the intersection block 105. A cover 107 including a pressure gauge 108 is coupled above the swab valve 106. A first wing valve 109A is coupled to a first side of the intersection block 105 and a second wing valve 109B is coupled to a second side of the intersection block 105.

The tree 100 includes a first choke valve 110A coupled to the first wing valve 109A and a second choke valve 110B coupled to the second wing valve 109B. The present disclosure contemplates that the first choke valve 110A and/or the second choke valve 110B may be used for metering of a natural gas well, such as along a pipeline (for example a natural gas pipeline). The present disclosure contemplates that one of the first choke valve 110A or the second choke valve 110B may be replaced with a manually operated wing connection, and the corresponding first wing valve 109A or the second wing valve 109B may be a manually operated wing valve. The first choke valve 110A includes a first flange 111 coupled to a flange 112 of a production line 113, and a second flange 114 coupled to a flange 115 of the first wing valve 109A. The production line 113 may be part of a line that leads to a storage facility and/or a production facility, such as a production facility that refines crude oil and/or a production facility that fractionates natural gas. The various valves shown in FIG. 1A may include adjustable wheels for adjusting flow rates through the valves. As an example, the lower master valve 103 is shown with an adjustable wheel for adjusting a flow rate through the lower master valve 103.

Figure 1B:
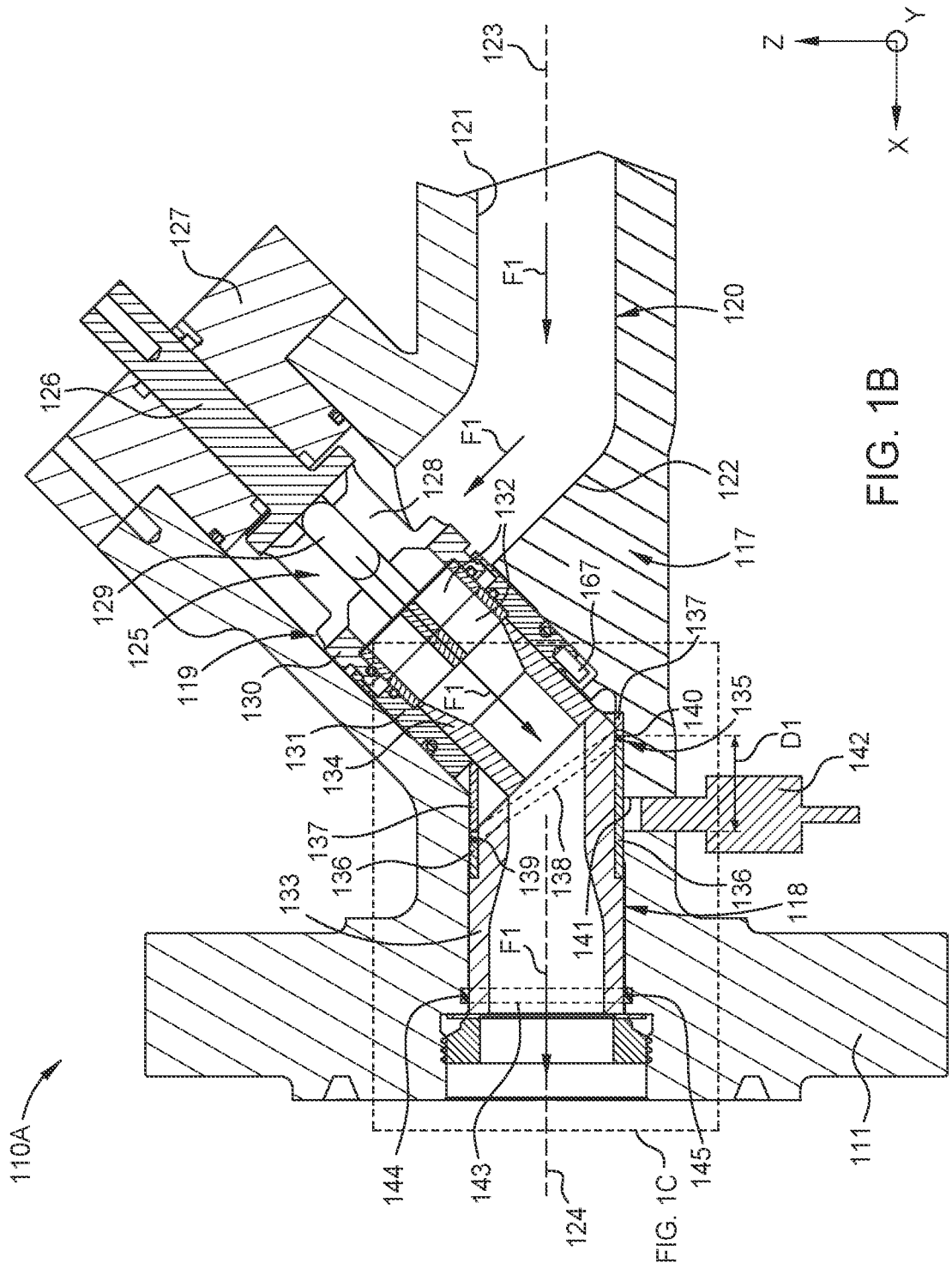
FIG. 1B is a schematic partial cross-sectional view of the first choke valve shown in FIG. 1A, according to one implementation.

FIG. 1B is a schematic partial cross-sectional view of the first choke valve 110A shown in FIG. 1A, according to one implementation. The present disclosure contemplates that the second choke valve 110B shown in FIG. 1A includes one or more of the aspects, features, components, and/or properties described herein for the first choke valve 110A.

The first choke valve 110A includes a valve body 117. The first flange 111 and the second flange 114 (shown in FIG. 1A) are part of and integrally formed with the valve body 117. The valve body 117 includes a first central opening 118, a second central opening 119, and a third central opening 120 formed in the valve body 117. Fluid F1 flows through the third central opening 120, into the second central opening 119 and through the second central opening 119, and into the first central opening 118 and through the first central opening 118. The fluid F1 may be a production fluid, such as crude oil and/or natural gas. The fluid F1 flows from the first wing valve 109A and into the third central opening 120. The fluid F1 flows through a first bend as the fluid flows from a first portion 121 of the third central opening 120 and through a second portion 122 of the third central opening 120. The second portion 122 is formed at an angle relative to the first portion 121 in the X-Z plane. A central axis of the second portion 122 is formed at the angle relative to a central axis 123 of the first portion 121. The central axis 123 extends through a center of the first portion 121. The fluid F1 flows through a second bend as the fluid flows from the second portion 122 of the third central opening 120 and through the second central opening 119. The fluid F1 flows through a third bend as the fluid F1 flows from the second central opening 119 and through the first central opening 118. The first central opening 118 includes a central axis 124 extending through a center of the first central opening 118. The central axis 124 of the first central opening 118 is parallel to the central axis 123 of the third central opening 120 and extends along the X-axis.

The first choke valve 110A includes a valve assembly 125 disposed in the second central opening 119. The valve assembly 125 includes a stem 126 disposed through a cover 127 that is coupled to the valve body 117. The stem 126 extends through the cover 127 and into the second central opening 119. The stem 126 includes a ring wall 128 and a plurality of openings 129 (two openings 129 are included) formed through the ring wall 128. The stem 126 includes a retainer portion 130. The valve assembly 125 includes a barrel 131 and a plurality of flow control disks 132 retained between the barrel 131 and the retainer portion 130 of the stem 126. The flow control disks 132 may be rotationally positioned to control flow of the fluid F1. Rotational positions of the flow control disks 132 establish a variable flow opening, resulting in a differential pressure of the fluid F1 across the flow control disks 132. The stem 126 is adjustable to adjust the flow rate and/or the pressure of the fluid F1. The stem 126 may be adjusted manually or automatically. As an example, the stem 126 may be adjusted manually using an adjustable wheel coupled to the stem 126. As another example, the stem 126 is adjusted automatically in response to a measured flow rate or measured pressure using the flow control disks 132.

The choke valve 110A includes a first sleeve 133, which could be a wear sleeve, disposed in the first central opening 118 and a second sleeve 134, which could be a wear sleeve, disposed in the second central opening 119. The second sleeve 134 may extend partially into the first central opening 118 (as shown in FIG. 1B). The first sleeve 133 may extend partially into the second central opening 119.

The choke valve 110A includes a seal assembly 135 disposed in the second central opening 119 and about the first sleeve 133. The seal assembly 135 includes a first retainer segment 136 disposed about the first sleeve 133, a second retainer segment 137 disposed about the first sleeve 133, and an angled seal 138 disposed about the first sleeve 133. The angled seal 138 is retained between the first retainer segment 136 and the second retainer segment 137. The seal assembly 135 may extend partially into the second central opening 119. The second retainer segment 137 extends partially into the second central opening 119.

Figure 1C:
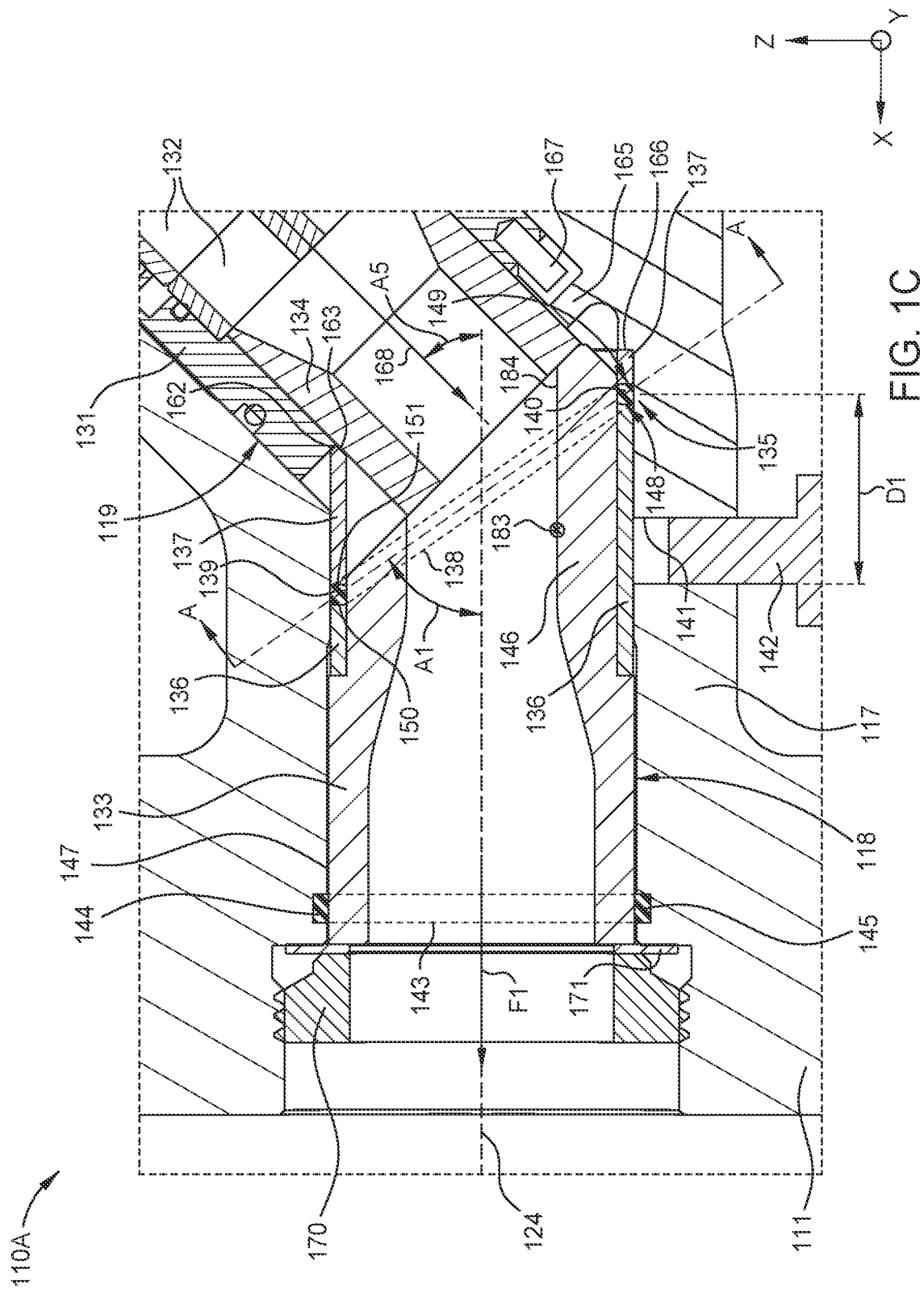
FIG. 1C is an enlarged schematic view of the first choke valve shown in FIG. 1B, according to one implementation.

The angled seal 138 may have a substantially circular shape (e.g. a circle having the same radius about the entire circumference of the circle) prior to installation within the seal assembly 135. When installed, the angled seal 138 is positioned at an angle relative to the central axis 124 of the first central opening 118 of the valve body 117, and has a substantially oval shape (e.g. a shape resembling the outline of an egg, an ellipse, an oblong, etc.) as shown in FIGS. 1B and 1C. The angled seal 138 includes an upper seal portion 139 and a lower seal portion 140 disposed below the upper seal portion 139. The lower seal portion 140 is horizontally offset from the upper seal portion 139 by a distance D1. The distance D1 extends along the X-Y plane and is parallel to the X-axis. The upper seal portion 139 is disposed to the left of the lower seal portion 140. The upper seal portion 139 includes an upper end of the angled seal 138 and a leftward end of the angled seal 138. The lower seal portion 140 includes a lower end of the angled seal 138 and a rightward end of the angled seal 138. In another embodiment, the seal 138 may be positioned perpendicular to the central axis 124 of the first central opening 118 of the valve body 117 similar to seal 143. Similarly, as further described below, the seal 143 can be positioned at an angle similar to the seal 138.

The choke valve 110A may include a sensor port 141 formed below the angled seal 138, and specifically between the angled seal 138 and the seal 143. The sensor port 141 is shown disposed below the upper seal portion 139 and to the left of the lower seal portion 140, however, the sensor port 141 can be positioned anywhere between the angled seal 138 and the seal 143 along the valve body 117. A sensor 142 is in fluid communication with the sensor port 141. In one embodiment, which can be combined with other embodiments, the sensor 142 is configured to detect fluid F1 in the sensor port 141. In one embodiment, which can be combined with other embodiments, the sensor 142 is configured to detect a pressure change in the sensor port 141 generated by fluid F1 flowing in the sensor port 141. The choke valve 110A includes the seal 143 disposed about the first sleeve 133 and in a vertical orientation such that the seal 143 is perpendicular to the central axis 124 of the central opening 118 of the valve body 117. An upper end 144 of the seal 143 is aligned with a lower end 145 of the seal 143 along the Y-Z plane, as shown in FIG. 1B. The seal 143 is a vertical seal such that a vertical plane, which is parallel to the Y-Z plane, extends through an entirety of a circumferential profile of the seal 143. In one embodiment which can be combined with other embodiments, each of the seal 143 and the angled seal 138 is an O-ring seal.

FIG. 1C is an enlarged schematic view of the first choke valve 110A shown in FIG. 1B, according to one implementation. The angled seal 138 is disposed about the first sleeve 133 at an angle A1 relative to the central axis 124 of the first central opening 118 of the valve body 117. The angle A1 is within the X-Z plane. The angle A1 is greater than 0 degrees and less than 90 degrees. In one embodiment, which can be combined with other embodiments, the angle A1 is within a range of 25 degrees to 75 degrees. A line of sight between the upper seal portion 139 and the lower seal portion 140 of the angled seal 138 is at the angle A1 relative to the central axis 124. The central axis 124 extends along the X-Y plane and is parallel to the X-axis. The first sleeve 133 includes a cylindrical portion 146 and an outer shoulder 147 extending outwardly relative to the cylindrical portion 146. The angled seal 138 is disposed between a first face 148 of the first retainer segment 136 and a second face 149 of the second retainer segment 137. The first face 148 includes a first concave radius surface 150, which may alternatively be a locally perpendicular swept surface, and the second face 149 includes a second concave radius surface 151, which may alternatively be a locally perpendicular swept surface, that faces the first concave radius surface 150. The first concave radius surface 150 is formed in the first retainer segment 136 and away from the angled seal 138, and the second concave radius surface 151 is formed in the second retainer segment 137 and away from the angled seal 138.

The angled seal 138 is retained, and compressed between, the first concave radius surface 150 and the second concave radius surface 151. The angled seal 138 is retained between the first concave radius surface 150 and the second concave radius surface 151 at the angle A1. The angled seal 138 is retained in an oval shaped position such that the angled seal 138 forms an approximately oval shape. The first retainer segment 136 and the second retainer segment 137 are disposed about the cylindrical portion 146 of the first sleeve 133. Each of the first sleeve 133 and the second sleeve 134 is formed of a wear material. The wear material may include one or more of tungsten-carbide and/or hardened metallic alloys such as stellite and/or various hard ceramic materials such as high-purity alumina ceramics, and/or zirconia ceramics.

The valve body 117 includes a first inner shoulder 165 formed between the first central opening 118 and the second central opening 119. The valve body 117 includes a second inner shoulder 166 formed in the first central opening 118. The valve assembly 125 abuts against the first inner shoulder 165 and the second sleeve 134. A buffer rod 167 coupled to the barrel 131 can abut against the first inner shoulder 165. The second retainer segment 137 abuts against one or more of the second sleeve 134, the second inner shoulder 166 of the valve body 117, and/or the barrel 131. In the implementation shown in FIG. 1C, the second retainer segment 137 abuts against the second sleeve 134, the second inner shoulder 166 of the valve body 117, and the barrel 131. The second retainer segment 137 includes an angled surface 162 that abuts against the barrel 131 and a tapered inner surface 163 that abuts against the second sleeve 134. The first retainer segment 136 abuts against the outer shoulder 147 of the first sleeve 133. The first sleeve 133 abuts against the second sleeve 134 at an intersection angle A5 in the X-Z plane. The intersection angle A5 is between the central axis 124 of the first sleeve 133 and a central axis 168 extending through a center of a central opening of the second sleeve 134.

The first sleeve 133 is retained in the first central opening 118 and abutting against the second sleeve 134 using a nut 170. The nut 170 is threaded into the flange 111 of the valve body 117. A washer 171 is disposed between the nut 170 and the first sleeve 133.

In one embodiment, one or both of the seal 138 and the seal 143 can be either angled or perpendicular to central axis 124. In both possible angled or perpendicular orientations, the sealing contact surfaces of the seals are between the outer diameter of the first sleeve 133 and the inner diameter of the body 117 forming the first central opening 118. The first retainer segment 136 and the second retainer segment 137 are provided to locate the angled seal 138 in the desired angle and position within the first central opening 118. Although only one angled seal 138 is shown positioned between the first retainer segment 136 and the second retainer segment 137, multiple angled seals may be positioned between the first retainer segment 136 and the second retainer segment 137. Although only one seal 143 is shown positioned at the end of the first sleeve 133, multiple seals may be positioned at the end of the first wear sleeve 133.

During operation of the first choke valve 110A, the fluid F1 flows from the second sleeve 134 and into the first sleeve 133. As the fluid F1 flows from the second sleeve 134 and into the first sleeve 133, the fluid F1 is directed at an inner surface 184 of the cylindrical portion 146 of the first sleeve 133 at a location 183 that is aligned horizontally between the lower seal portion 140 of the angled seal 138 and the lower end 145 of the seal 143. During initial operation and prior to wearing of the first sleeve 133, the sensor port 141 is fluidly separated from the fluid F1 using the angled seal 138 and the seal 143. As the first sleeve 133 wears from the flow of fluid F1, such as from an abrasive material (such as sand) in the fluid F1, the first sleeve 133 wears to a location aligned horizontally between the lower seal portion 140 of the angled seal 138 and the lower end 145 of the seal 143. After the first sleeve 133 wears, the fluid F1 and/or associated fluid pressure may reach the sensor port 141. Upon the fluid F1 reaching the sensor port 141, the sensor 142 detects the fluid F1 and/or a pressure change generated by the fluid F1 in the sensor port 141. The sensor 142 detects that the first sleeve 133 has worn through such that the fluid F1 passes through the cylindrical portion 146 of the first sleeve 133. The sensor 142 generates a signal that the first sleeve 133 has worn through such that an operator can replace the first wear sleeve with a new wear sleeve that is unworn. The first sleeve 133 can be replaced prior to wearing of the valve body 117 such that the valve body 117 does not leak and require repair or replacement. The angled seal 138 facilitates replacement of the first sleeve 133 and operational lifespan of the first choke valve 110A and facilitates operational efficiencies, increased product lifespans, reduced costs, and reduced operational downtime.

Figure 1D:
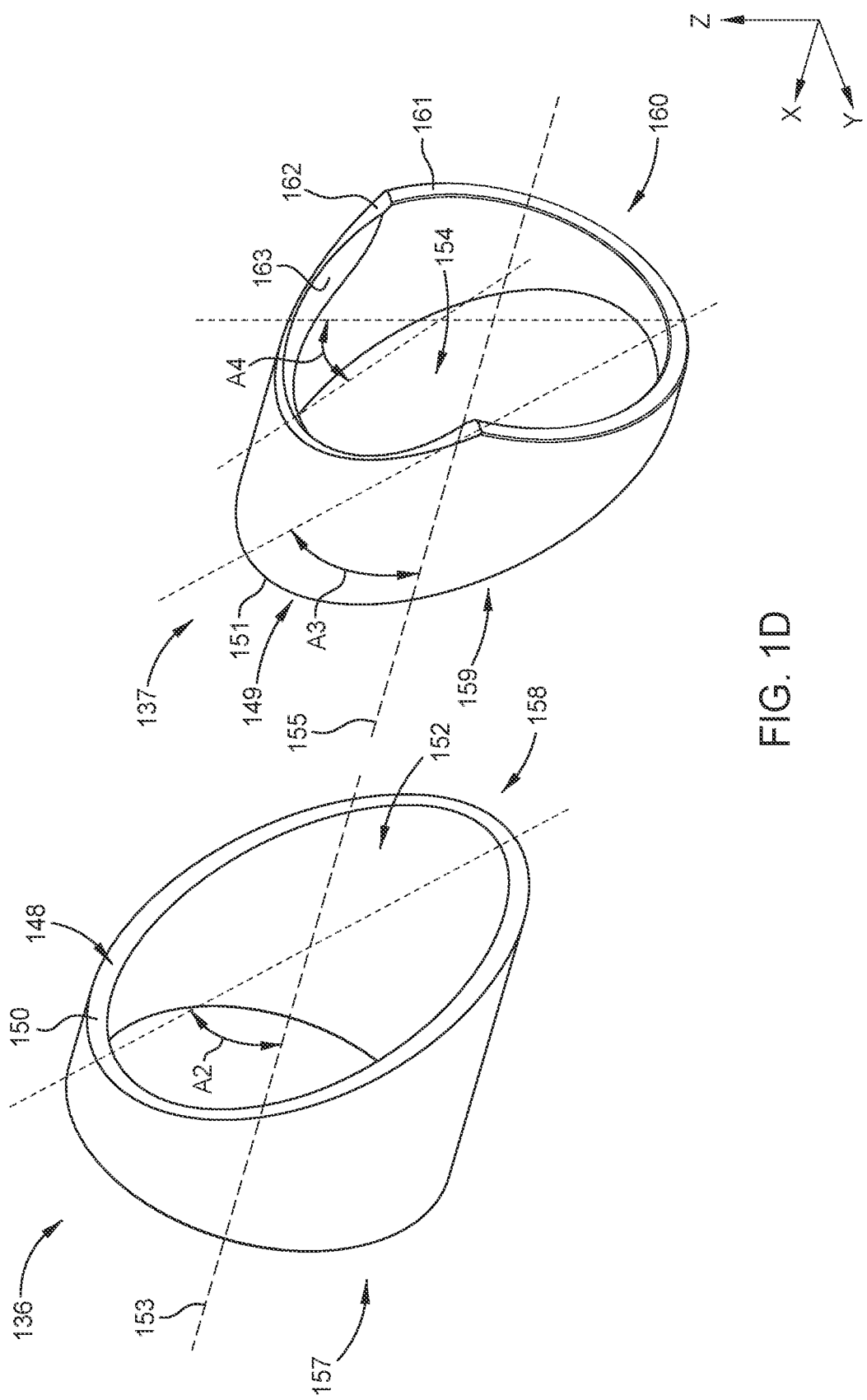
FIG. 1D is a schematic isometric view of the first ring segment and the second ring segment of the seal assembly shown in FIGS. 1B and 1C, according to one implementation.

FIG. 1D is a schematic isometric view of the first retainer segment 136 and the second retainer segment 137 of the seal assembly 135 shown in FIGS. 1B and 1C, according to one implementation. The first retainer segment 136 includes a first central opening 152 and a first central axis 153 extending through a center of the first central opening 152. The first concave radius surface 150, which may alternatively be a locally perpendicular swept surface, is a first retainer surface that is formed at an angle A2 relative to the first central axis 153 in the X-Z plane. The angle A2 is greater than 0 degrees and less than 90 degrees. The angle A2 is about equal to the angle A1 described above, such as within a 5 degree different or less relative to the angle A1.

The second retainer segment 137 includes a second central opening 154 and a second central axis 155 extending through a center of the second central opening 154. The second concave radius surface 151, which may alternatively be a locally perpendicular swept surface, is a second retainer surface that is formed at an angle A3 relative to second central axis 155 in the X-Z plane. The angle A3 is greater than 0 degrees and less than 90 degrees. The angle A3 is about equal to the angle A2 described above, such as within a 5 degree different or less relative to the angle A2. The first concave radius surface 150 is formed in the first retainer segment 136 and away from the angled seal 138 to form a bowl shape of the first face 148, and the second concave radius surface 151 is formed into the second retainer segment 137 and away from the angled seal 138 to form a bowl shape of the second face 149. When disposed in the valve body 117 (as shown in FIG. 1B), the first central axis 153 of the first retainer segment 136 and the second central axis 155 of the second retainer segment 137 are coaxially aligned with the central axis 124 of the first sleeve 133 such that the first concave radius surface 150 and the second concave radius surface 151 are formed at the respective angles A2, A3 relative to the central axis 124 of the first sleeve 133. In one implementation, the angles A1, A2 and A3 may be substantially equal to each other as described above.

The first retainer segment 136 includes a first end side 157 and a second end side 158. The first face 148 is formed in the second end side 158 of the first retainer segment 136. The second retainer segment 137 includes a first end side 159 and a second end side 160. The second face 149 is formed in the first end side 159 of the second retainer segment 137. The second end side 160 of the second retainer segment 137 includes a vertical surface 161 and the angled surface 162 formed at an end angle A4 relative to the vertical surface 161 in the X-Z plane. The end angle A4 is greater than 0 degrees and less than 90 degrees.

Figure 1E:
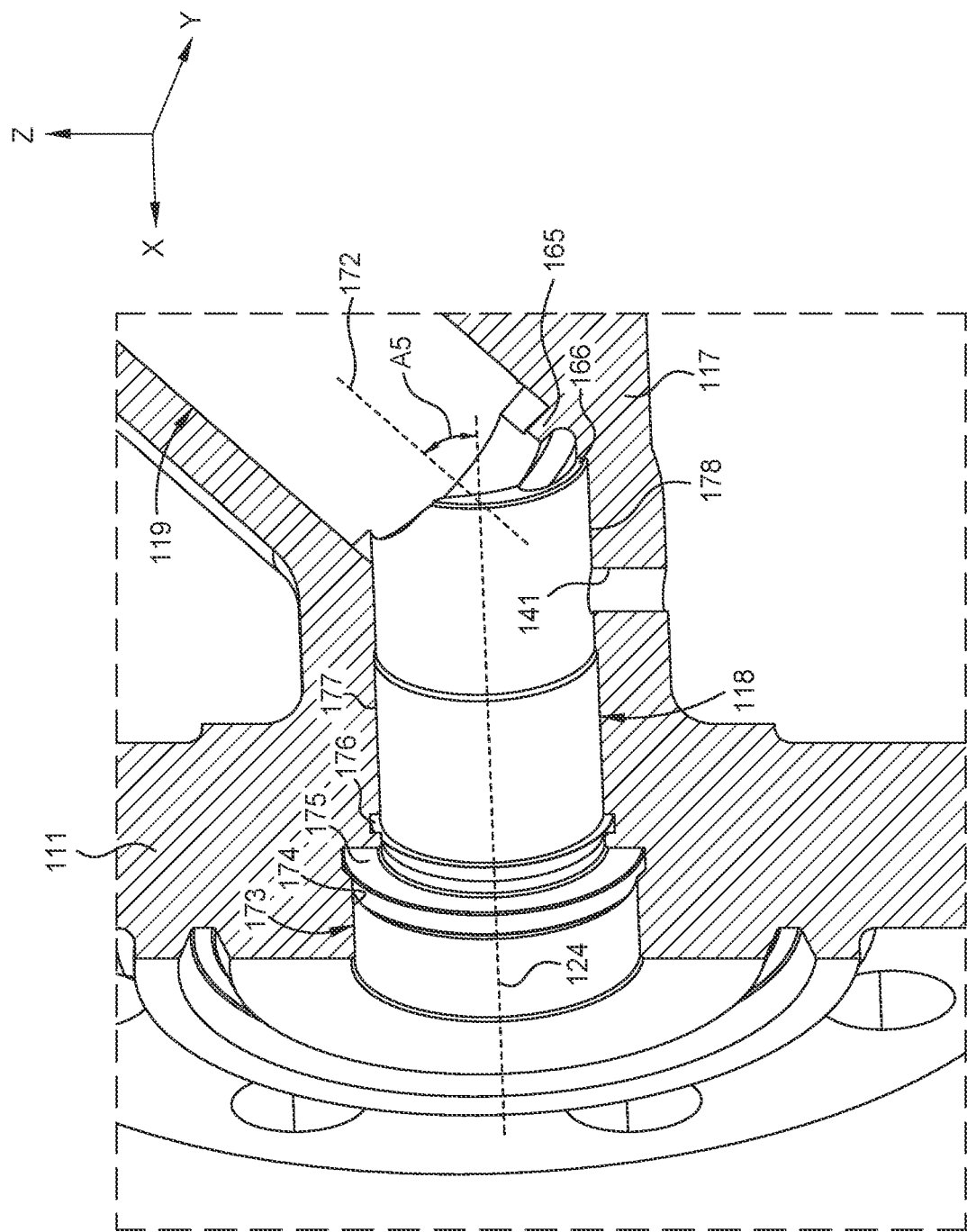
FIG. 1E is a schematic partial cross-sectional isometric view of the valve body shown in FIGS. 1B and 1C, according to one implementation.

FIG. 1E is a schematic partial cross-sectional isometric view of the valve body 117 shown in FIGS. 1B and 1C, according to one implementation. The second central opening 119 includes a central axis 172 extending through a center of the second central opening 119. The central axis 172 of the second central opening 119 intersects the central axis 124 of the first central opening 118 at the intersection angle A5 in the X-Z plane. The first central opening 118 includes a recessed portion 173 formed in the flange 111. The recessed portion 173 includes a threaded inner surface 174 and an inner shoulder 175 formed inward of the threaded inner surface 174. The first central opening 118 includes a seal groove 176 formed in an inner surface 177 of the first central opening 118. The first central opening 118 includes a necked inner surface 178 that includes an inner diameter that is less than an inner diameter of the inner surface 177. The inner diameter of the necked inner surface 178 is less than an outer diameter of the outer shoulder 147. The first retainer segment 136 and the second retainer segment 137 are inserted into and retained in the necked inner surface 178. The outer shoulder 147 are inserted into and retained in the inner surface 177.

Figure 1F:
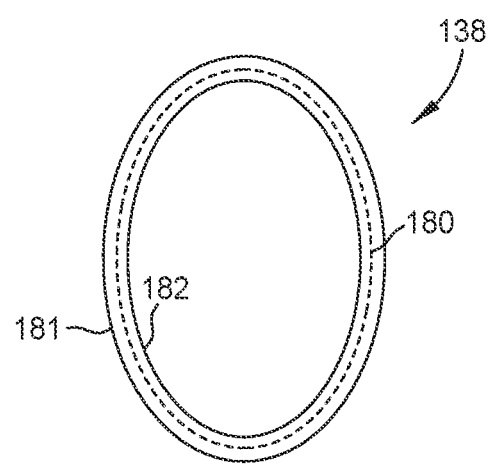
FIG. 1F is a schematic partial cross-sectional view of the angled seal shown in FIG. 1C, taken along sectional plane A-A shown in FIG. 1C, according to one implementation.

FIG. 1F is a schematic partial cross-sectional view of the angled seal 138 shown in FIG. 1C, taken along sectional plane A-A shown in FIG. 1C, according to one implementation. The angled seal 138 is shown in the angled position and forming an oval shape. The sectional plane A-A is taken at the angle A1. The angled seal 138 is disposed in an oval shaped position. The angled seal 138 includes an oval shaped profile 180 extending through a center of the cross section of the angled seal 138. The angled seal 138 includes an outer circumference 181 and an inner circumference 182. The sectional plane A-A extends through the entirety of the outer circumference 181 and the entirety of the inner circumference 182. The outer circumference 181 compressively couples in a fluid sealing manner with the inside of the body 117, and the inner circumference 182 compressively couples in a fluid sealing manner with the outside of the first sleeve 133, thereby containing the fluid F1 and associated fluid pressure within the first choke valve 110A.

Figure 2A:
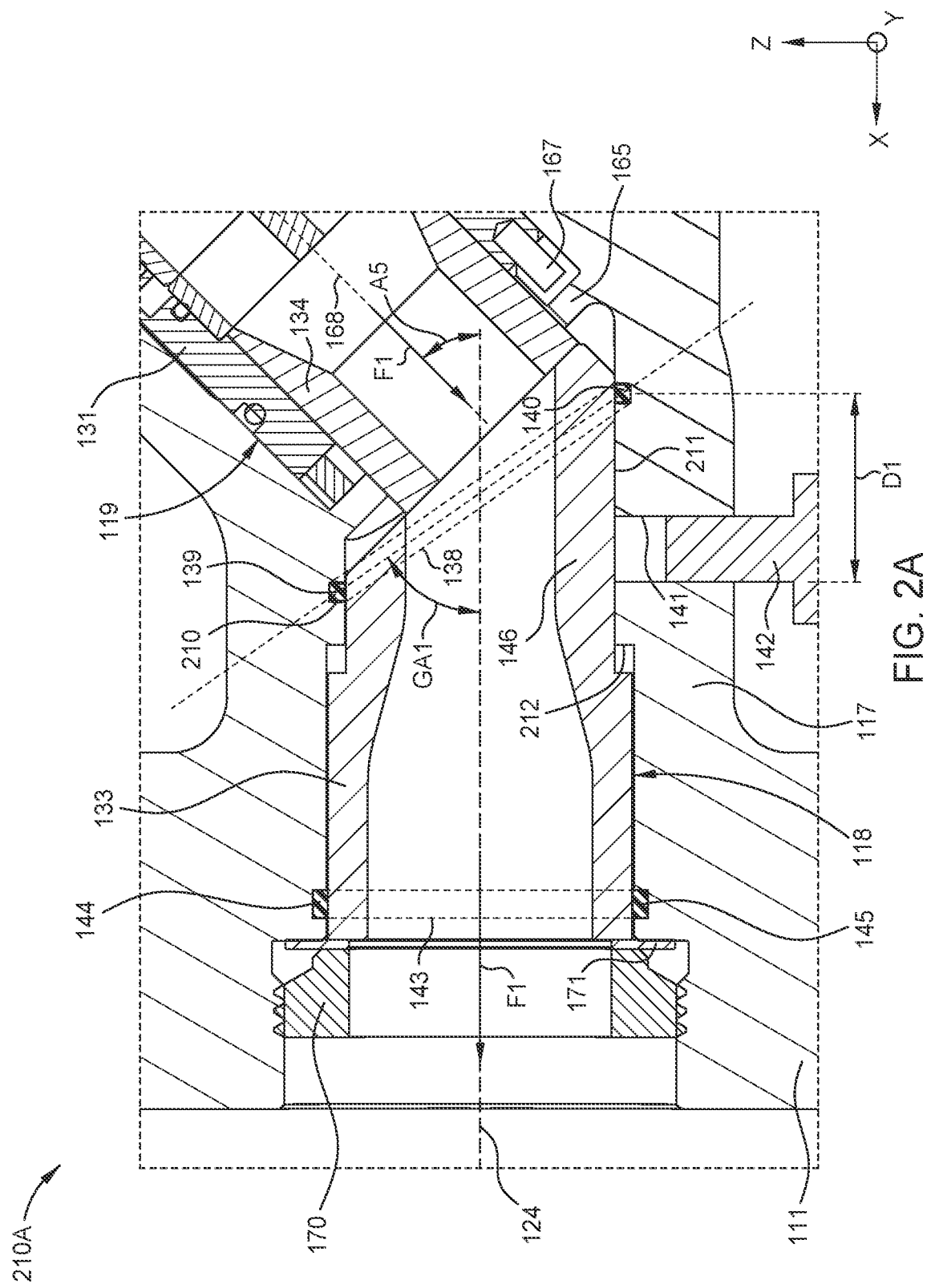
FIG. 2A is a schematic partial cross-sectional view of a choke valve, according to one implementation.

FIG. 2A is a schematic partial cross-sectional view of a choke valve 210A, according to one implementation. The choke valve 210A is similar to the first choke valve 110A shown in FIGS. 1B and 1C, and includes one or more of the aspects, features, components, and/or properties thereof. The choke valve 210A may be used in place of the first choke valve 110A and/or the second choke valve 110B. The angled seal 138 is disposed in and retained in an oval shaped groove 210 formed in an inner surface 211 of the first central opening 118 of the valve body 117. The oval shaped groove 210 retains the angled seal 138 in the angled position at the angle A1 and in the oval shape. The oval shaped groove 210 is formed at a groove angle GA1 relative to the central axis 124 of the first central opening 118 of the valve body 117. The groove angle GA1 is in the X-Z plane. The groove angle GA1 is greater than 0 degrees and less than 90 degrees. In one embodiment, which can be combined with other embodiments, the groove angle GA1 is about equal to, such as within a 5 degree difference of, the angle A1. The inner surface 211 is part of an inner shoulder 212 of the first central opening 118.

Figure 2B:
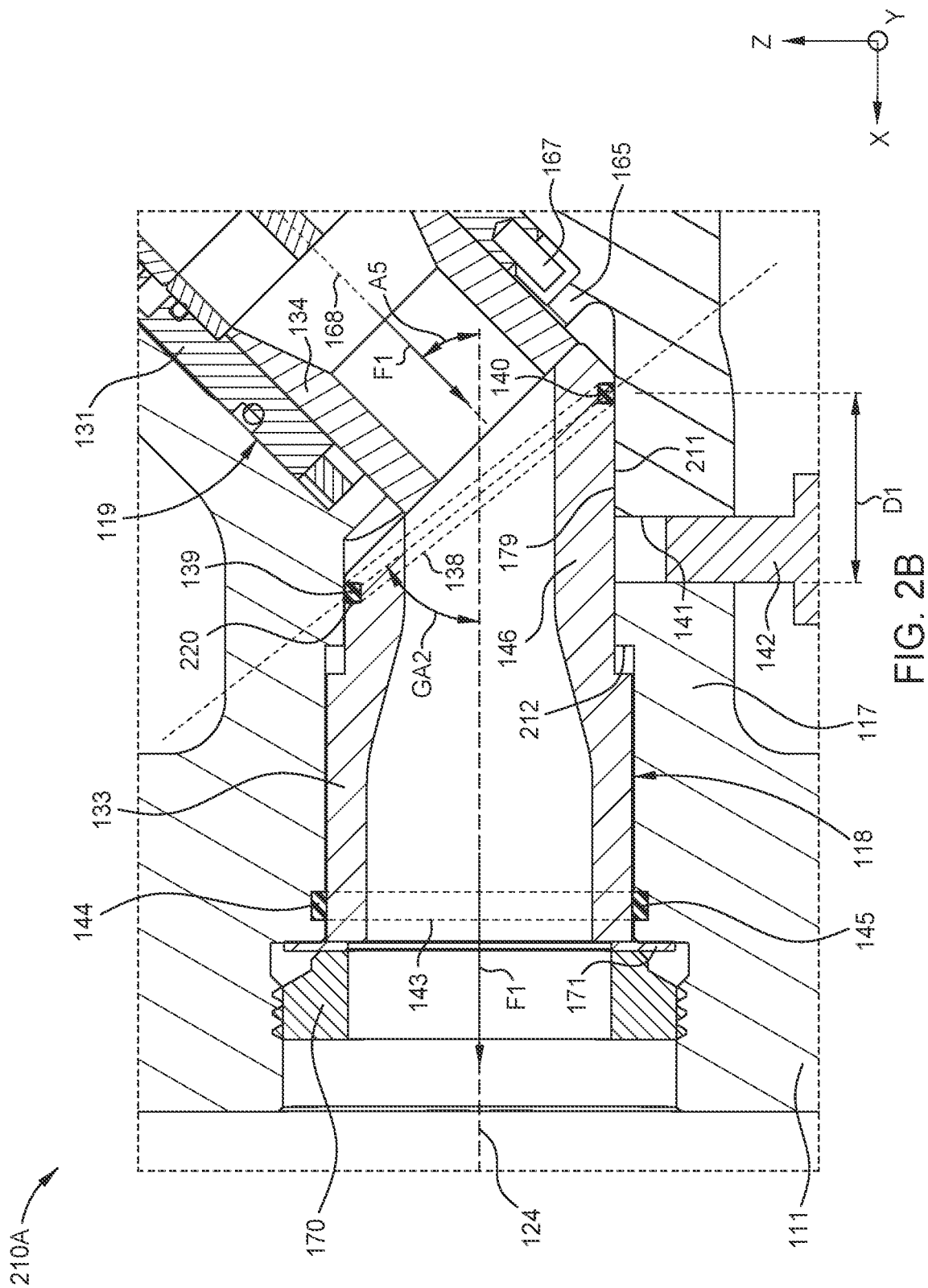
FIG. 2B is a schematic partial cross-sectional view of a choke valve, according to one implementation.

FIG. 2B is a schematic partial cross-sectional view of a choke valve 211A, according to one implementation. The choke valve 211A is similar to the choke valve 210A shown in FIG. 2A, and includes one or more of the aspects, features, components, and/or properties thereof. In the implementation shown in FIG. 2A, the angled seal 138 is retained in the oval shaped groove 210.

In the implementation shown in FIG. 2B, the oval shaped groove 210 shown in FIG. 2A is omitted from the inner surface 211, and the angled seal 138 is disposed and retained in an oval shaped groove 220 (shown in ghost) formed in an outer surface 179 of a cylindrical portion 146 of the first sleeve 133. The oval shaped groove 220 is formed at a groove angle GA2 relative to the central axis 124 of the first central opening 118 of the valve body 117. The groove angle GA2 is in the X-Z plane. The groove angle GA2 is greater than 0 degrees and less than 90 degrees. In one embodiment, which can be combined with other embodiments, the groove angle GA2 is about equal to, such as within a 5 degree difference of, the angle A1.

Aspects described herein, such as the seal assembly 135, the oval shaped groove 210, the oval shaped groove 220, the sensor port 141, and the sensor 142, are described for choke valves, such the first choke valve 110A disposed on the trees of an oil and gas well. The first choke valve 110A is a pressure containing body apparatus and the valve body 117 is a pressure containing body. The present disclosure contemplates that the aspects described herein may be used in other pressure containing body apparatus and/or other pressure containing bodies. For example, the aspects may be used in a gate valve and/or a pressure control valve (PCV). The aspects may be used in metering equipment, such as metering equipment disposed at the exit of a natural gas well or along a natural gas pipeline.

Benefits of the present disclosure include reliable and timely indication of erosion, use on oil and gas production lines having high abrasive material contents, reducing likelihoods of pressure containing bodies leaking, positioning seals in angled positions, ease of use of pressure containing apparatus, ease of installation and replacement of angled seals and wear sleeves, efficiency, cost savings, operational time savings, and reduced operational downtime.

It is contemplated that one or more of the aspects disclosed herein may be combined. Moreover, it is contemplated that one or more of these aspects may include some or all of the aforementioned benefits.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

I claim:

1. A pressure containing body apparatus, comprising:
a pressure containing body comprising a central opening and a central axis extending through the central opening;
a sleeve disposed in the central opening of the pressure containing body;
an angled seal disposed about the sleeve at an angle relative to the central axis of the pressure containing body, wherein the angle is greater than 0 degrees and less than 90 degrees;
a first retainer segment disposed about the sleeve;
a second retainer segment, wherein the seal is disposed between a first face of the first retainer segment and a second face of the second retainer segment, wherein the first retainer segment abuts against an outer shoulder of the sleeve.

2. The pressure containing body apparatus of claim 1, wherein the angled seal is retained in an oval shaped position.

3. The pressure containing body apparatus of claim 1, wherein the angled seal comprises an upper seal portion and a lower seal portion, wherein the lower seal portion is horizontally offset from the upper seal portion.

4. The pressure containing body apparatus of claim 3, wherein the angled seal is an O-ring seal.

5. The pressure containing body apparatus of claim 3, further comprising a sensor port formed below the angled seal, wherein the sensor port is aligned horizontally between the upper seal portion and the lower seal portion of the angled seal.

6. The pressure containing body apparatus of claim 5, further comprising a sensor in fluid communication with the sensor port.

7. The pressure containing body apparatus of claim 1, wherein the pressure containing body is a valve body.

8. The pressure containing body apparatus of claim 7, wherein the valve body is part of a choke valve.

9. A pressure containing body apparatus, comprising:
a pressure containing body comprising a central opening and a central axis extending through the central opening;
a first sleeve disposed in the central opening of the pressure containing body, the first sleeve comprising a cylindrical portion and an outer shoulder extending outwardly relative to the cylindrical portion; and
a seal disposed about the first sleeve and between a first face of a first retainer segment and a second face of a second retainer segment, wherein:
the first retainer segment abuts against the outer shoulder of the first sleeve,
the first retainer segment and the second retainer segment are disposed about the cylindrical portion of the first sleeve, and
each of the first face and the second face includes a retainer surface formed at an angle relative to the central axis of the pressure containing body, wherein the angle is greater than 0 degrees and less than 90 degrees.

10. The pressure containing body apparatus of claim 9, wherein the first sleeve is formed of tungsten-carbide.

11. The pressure containing body apparatus of claim 9, wherein each of the first face and the second face comprises a concave radius surface.

12. The pressure containing body apparatus of claim 9, further comprising a second seal disposed about the outer shoulder of the first sleeve.

13. The pressure containing body apparatus of claim 9, wherein the seal is an O-ring seal, and the O-ring seal is retained in an oval shaped position between the first face of the first retainer segment and the second face of the second retainer segment.

14. The pressure containing body apparatus of claim 9, further comprising an O-ring seal disposed about the outer shoulder of the first sleeve.

15. The pressure containing body apparatus of claim 9, wherein the second face of the second retainer segment is formed in a first end side of the second retainer segment, and a second end side of the second retainer segment comprises a vertical surface and an angled surface formed at an end angle relative to the vertical surface, wherein the end angle is greater than 0 degrees and less than 90 degrees.

16. The pressure containing body apparatus of claim 9, wherein the first sleeve abuts against a second sleeve at an intersection angle, and the second sleeve is disposed in a second central opening of the pressure containing body.

17. The pressure containing body apparatus of claim 16, wherein the second retainer segment abuts against one or more of the second sleeve or an inner shoulder of the pressure containing body.

18. A seal assembly for disposal in a pressure containing body, the seal assembly comprising:
- a first retainer segment comprising a first central opening, a first central axis extending through the first central opening, and a first face having a first retainer surface formed at an angle relative to the first central axis, wherein the angle is greater than 0 degrees and less than 90 degrees;
- a second retainer segment comprising a second face having a second retainer surface facing the first retainer surface, wherein the second retainer surface is formed at the angle;
- a seal retained between the first retainer surface and the second retainer surface, wherein the seal is retained at the angle; and
- a sleeve disposed through the first central opening of the first retainer segment such that the first retainer segment abuts against an outer shoulder of the sleeve.

* * * * *